Patented Jan. 26, 1943

2,309,336

UNITED STATES PATENT OFFICE 2,309,336

ADDITION AGENT FOR LUBRICATING OILS

Gordon D. Byrkit, Ponca City, Okla., assignor to Continental Oil Company, Ponca City, Okla., a corporation of Delaware No Drawing. Application August 26, 1938, Serial No. 226,966

5 Claims. (Cl. 260—410)

My invention relates to an addition agent for lubricating oils and to an improved lubricating oil formed therefrom.

This application is a continuation in part of my copending application, Serial No. 87,464, filed June 26, 1936.

Present day mechanical devices require lubricating oils of high film strength. It has been found that the highest quality straight hydrocarbon lubricants have a film strength insufficient for efficient use in present day mechanical devices. High quality straight hydrocarbon lubricants used under conditions of high pressure, low speed and/or high temperatures, have a tendency to break down due to their low film strength. With high pressures between the rubbing surfaces, the body of the lubricant is squeezed out and only a thin film remains. It is readily seen that with a low film strength lubricant, there is a tendency for the lubricant to break down, decompose, and allow the rubbing surfaces to come in contact and cause seizure.

It is well known that mineral lubricating oils are deficient in oiliness, which is the most important character of the lubricant when used under conditions of boundary lubrication where the viscosity of the lubricant plays little or no part. Boundary lubrication conditions are obtained when engines are operating at heavy loads, low speed, or if for any reason the supply of lubricant is cut off or not sufficient. This last condition may exist when for mechanical reasons the lubricant pump is not functioning properly or when the lubricant feed line is clogged with foreign matter.

In starting idle mechanical equipment which is lubricated from a sump by pumping or circulating the lubricant, there is always a short period of time in which the rubbing surfaces must operate under conditions of dry friction if ordinary hydrocarbon lubricants are used. With dry friction the wear on friction surfaces is extreme, and during cold weather, when the lubricant is sluggish or during periods when the lubricating system is not functioning properly for one reason or another, rubbing surfaces may not only suffer considerable wear but may be damaged to the point where they must be replaced. By means of my invention, it is possible to produce a material, which when blended with hydrocarbon lubricants has the very important property of reacting with the metal surfaces, penetrating and/or adsorbing on the metal, leaving a film of lubricant with high oiliness characteristics, which remains on the metal surface irrespective of the length of time the machine has been idle. This high oiliness film gives very smooth operation, which may be easily discerned by the experienced operator and lubricating engineer.

One object of my invention is to provide materials, which when added to mineral lubricating oils improve their oiliness and load-carrying ability and enable the oil to lower the friction between the rubbing surfaces.

Another object of my invention is to provide a material, which when blended with the hydrocarbon oils will produce a lubricant which will maintain a very low coefficient of friction when diluted with light hydrocarbons such as are obtained in an automobile crankcase by incomplete combustion of the fuel.

A further object of my invention is to provide a material which when blended with hydrocarbon lubricants will confer upon it penetrative lubricity characteristics. It has been found that by my process, a lubricant is produced which does not drain off the rubbing surfaces when idle, thereby providing a lubricating film on the rubbing surfaces at all times and being of great value to the life of the machine in cold-weather starting, when the lubricant is very stiff and sluggish.

A still further object of my invention is to provide a material, which when blended with a lubricant enables it to produce a more nearly constant coefficient of friction, thereby insuring smoother engine operation.

It is well known to the art that the addition of certain chlorinated or otherwise halogenated organic materials to mineral lubricants improves the character of the latter in these various respects. For example, U. S. Patent 1,944,941, issued to Bert H. Lincoln and Alfred Henriksen on January 30, 1934, describes a lubricating oil comprising in combination a hydrocarbon oil and a small quantity of certain halogenated esters, which improve the oiliness and load-carrying ability of the mineral oil, confer upon it penetrative lubricity characteristics and enable it to reduce the coefficient of friction between rubbing surfaces.

I have found that material excellently suited for the purpose of improving these characteristics of hydrocarbon oil may be obtained by the interaction of various chlorinated waxes with anhydrous metal salts of organic acids. The chlorinated or otherwise halogenated wax may be prepared from hydrocarbon paraffin wax or from naturally occurring ester-like waxes such as carnauba wax or from synthetic wax-like esters such as octadecyl stearate. Such materials as these may be chlorinated or otherwise halogenated by direct treatment with the halogen at ordinary or elevated temperatures.

In the prior art, references are made to monochloro paraffin, dichloro paraffin, trichloro paraffin and the like as if these products were the result of direct chlorination of paraffins to the desired chlorinated product. I have found these materials are crude mixtures of chlorinated hydrocarbons and invariably contain unchlorinated hydrocarbons, monochlorinated hydrocarbons, dichlorinated hydrocarbons, and polychloro hydrocarbon derivatives. For example, a so-called "trichloro paraffin wax" containing 24 percent chlorine, which corresponds closely to the percentage of chlorine in the trichloro compound, was separated by means of crystallization from acetone. The least soluble portion consisted of unchlorinated wax. The next least soluble portion consisted of a mixture of monochloro wax and unchlorinated wax. The percentage of unchlorinated wax in the original mixture was found to be 7.2 percent. Thus, even in a "trichloro paraffin" so-called, of the prior art, there is a large percentage of unchlorinated wax and quantities of monochlorinated wax and dichlorinated wax, besides trichlor wax and more highly chlorinated waxes.

In carrying out the method of my invention, the use of a crude mixture of chlorinated waxes will not give the same results as a substantially pure chlorinated wax. Even though the appropriate amount of chlorine is introduced into a wax to form a monochloro wax, the crude chlorination mixture will contain in addition to small amounts of chlorine and hydrogen chloride, and the desired monochlor wax, unchlorinated wax and more highly chlorinated waxes.

I have found that, on introducing chlorine into the higher paraffin hydrocarbons, as for example, paraffin wax, the formation of the di- and higher poly-chlor waxes begins when only 5 percent by weight of chlorine has been introduced into the paraffin hydrocarbon. This formation of di-, and higher poly-chlor waxes proceeds more rapidly than the chlorination of the hydrocarbon to the monochlor compound so that the proportion of the latter in a crude chlorinated mixture decreases rapidly and is at a maximum when about 10 percent of chlorine has been introduced. At this point, a typical chlorinated mixture will contain about 25–30 percent of unchlorinated wax, 40–50 percent of monochlor wax, and about 20–25 percent of dichlor wax, as well as higher chlorinated waxes. Even when as much as 24 percent by weight of chlorine is introduced into a paraffin wax, about 10 percent of unchlorinated hydrocarbon is still present in the mixture. The removal of unchlorinated hydrocarbons from the crude chlorinated mixture is the first step in preparing relatively pure monohalogen compounds, and higher halogenated compounds, but it will be obvious that the chlorine compounds, when separated from the unchlorinated hydrocarbon, form a crude mixture of hydrocarbons in various stages of chlorination.

The chlorination of most petroleum hydrocarbons lowers their melting points and, to a certain degree, the greater the extent of chlorination, that is to the more chlorine atoms per molecule, the lower the melting point. The decrease in melting point is stepwise. This permits me to separate unchlorinated hydrocarbons from the monochlor hydrocarbons, the monchlor hydrocarbons from the dichloro hydrocarbons, and the dichloro hydrocarbons from the trichloro hydrocarbons. Having selected the hydrocarbon in accordance with the desired final product, I chlorinate the hydrocarbons until approximately that amount of chlorine is absorbed which will produce monochlor compounds, if these are desired, or larger amounts of chlorine to produce di-, and higher poly-chloro hydrocarbons when these products are desired. For example, in the manufacture of a monochloro hydrocarbon containing 18-24 carbon atoms per molecule, I select a paraffin wax having a melting point of approximately 120° F. I introduce into this wax about 10 percent of added chlorine which will form a mixture containing as an average about the same weight of chlorine as the monochlor product. This may vary from not less than 8 to not more than 12 percent, without being disadvantageous. The percentage of chlorine introduced into the hydrocarbon will be less in the case of the higher molecular weight, higher melting hydrocarbons. The chlorination may be accomplished by any suitable method and any appropriate apparatus. I prefer to melt the wax and agitate thoroughly, while the chlorine gas is introduced into contact therewith so as to be well distributed through the liquid. The heat of reaction is ordinarily ample to maintain the mixture in the liquid state without further heating. I make provision for the escape of quantities of hydrogen chloride gas which are evolved, and for unreacted chlorine. When a sufficient quantity of chlorine has been introduced, I blow the mixture with air or other inert gas such as carbon dioxide until the hydrogen chloride and free chlorine are substantially removed.

Even though the appropriate amount of chlorine is introduced into the wax to form a monochlor wax, as I have pointed out above, it will be found that the crude chlorination mixture contains in addition to the byproduct hydrogen chloride and the desired monochlor wax, also unchlorinated wax and more highly chlorinated waxes.

The unchlorinated wax is separated from the air blown mixture by pressing at such temperature that the chlorinated waxes are largely liquid and the unchlorinated wax is mostly solid. The appropriate temperature to which the mixture must be chilled before the pressing operation begins will depend upon the character of the hydrocarbon used initially, and may vary considerably. For example, when a wax having a melting point of 120° F. is used as the starting material, a temperature of about 80–90° F. is suitable for the separation of unchlorinated wax from the mixture.

Other separation processes, for example, sweating, may be employed to separate the solid, unchlorinated wax from the liquid chlorinated waxes.

The liquid chlorinated waxes will consist largely of monochlor wax and dichlor wax. These may be separated by crystallization from acetone or any other suitable solid, using a solvent-chlor wax ratio of from 1 to 1 to 20 to 1. The solution is prepared by warming and is then chilled to approximately −15° to −20° F. to precipitate the chlorinated waxes which are then removed by filtering, pressing, settling, or in any other suitable manner.

The monochlor wax is precipitated out of the solution nearly quantitatively and its separation from the dichlor and polychlor waxes present is readily accomplished.

Instead of acetone, such selective solvents as methylethyl ketone, acetone-benzene mixtures, acetone-methylene chloride mixtures or various halogenated solvents may be employed. It will be obvious that the quantity of solvent and the temperature to which the solution should be chilled will depend upon the particular materials being processed and may be readily determined empirically. The halogenated solvents serve to aid in the precipitation of unchlorinated waxes, while benzene increases the solubility of the more highly chlorinated materials.

The monochlor wax thus obtained was found to contain approximately the theoretical chlorine content. Various batches show chlorine contents of 10.1, 10.5, 10.3, and 10.8 percent. The theoretical chlorine content is 10.2 percent so that it will be apparent that the monochlor wax obtained is substantially free from unchlorinated waxes and highly chlorinated waxes. The monochlor wax was found to behave very much like a pure compound. I proved the homogeneity of my monochlor wax, for example, by chilling until approximately half of the material had solidified. Solid and liquid portions were separated by filtration and contained 12.1 and 11.4 percent chlorine respectively. My monochlor wax is therefore free from both unchlorinated wax and more highly chlorinated wax. Similarly, I may prepare according to my invention di- and polychloro waxes free from unchlorinated wax and monochlor wax, as well as more highly chlorinated waxes.

Any of the relatively pure chlorinated waxes may be used in carrying out my invention. One of these waxes is condensed with the anhydrous metal salt of an organic acid. The organic acid may be of any type; that is, aliphatic, aromatic, or heterocyclic or may belong to more than one of these classes. I have found that the use of halogenated organic acids for this purpose gives products which are particularly efficient in improving the characteristics of mineral lubricating oil when blended with them. The chosen organic acid is converted to the sodium salt or other metallic salt by means of neutralization with a suitable base such as sodium hydroxide, barium hydroxide, etc., and rendered anhydrous by intensive drying, or, if necessary, fusion.

Our condensation products are of several types depending on the structure of the starting materials:

I. Esters from monohalogen compounds:
   A. Esters from monohalogenated hydrocarbons.
      These are esters of the type $RCO_2R'$ derived from the metal salt, $RCO_2M$, and the halogenated hydrocarbon, $R'X$. M represents a metal; X represents a halogen. These esters hydrolyze to form an acid and an alcohol. Examples of monohalogenated hydrocarbons which may be used are:
      1. Monochloroparaffin wax
      2. Monochloro-decane
      3. Monochloro-pentane
      4. Monochloro-gasoline hydrocarbons
      5. Monochloro-kerosene hydrocarbons
   B. Diesters from monohalogenated esters.
      These are of three types depending on the position of the halogen.
      1. Halogen in the acid radical.
         These esters are of the type, $RCH(O.CO.R')(CH_2)_nCO_2R''$, derived from the metal salt $R'COOM$ and the monochloroester, $RCHCl(CH_2)_nCO_2R''$. R may be H or an organic radical; n may be zero or any integer. These esters are distinguished in that they hydrolyze to form an alcohol, $R''OH$, an acid, $R'CO_2H$, and a hydroxy acid, $$RCHOH(CH_2)_nCO_2H$$

Examples of monohalogenated esters which may be used are:
         a. Octadecyl alpha-bromostearate
         b. Monochloro-carnauba wax
         c. Monochloro-beeswax
      2. Halogen in the alcohol radical.
         These esters are of the type, $RCO_2R'O.CO.R''$, derived from the metal salt $R''CO_2M$ and the monochloro-ester, $RCO_2R'X$ in which $R'$ is a divalent organic radical. These esters are distinguished in that they hydrolyze to form two acids, $RCO_2H$ and $R''CO_2H$ and a glycol, $R'(OH)_2$ which may be vicinal or disjoined depending on the position of the halogen. Examples of monohalogenated esters which may be used are:
         a. Beta-chloroethyl stearate
         b. Monochloro-octadecyl stearate
         c. Monobromo-carnauba wax
II. Esters from dihalogen compounds:
   A. Esters from dihalogenated hydrocarbons.
      These esters are of the type, $(RCO_2)_2R'$, in which $R'$ is a divalent organic radical, derived from the metal salt, $RCO_2M$, and the dihalogenated hydrocarbon, $R'Cl_2$. These esters are distinguished in that they hydrolyze to form an acid, $RCO_2H$, and a ketone if both halogen atoms in $R'Cl_2$ are on the same carbon atom; an acid and a vicinal glycol if the halogens are on adjoining carbon atoms; and an acid and a disjoined glycol if the halogens are on disjoined carbon atoms. Examples of dihalogenated hydrocarbons which may be used are:
      1. 3,3-dichlorodecane
      2. 2,3-dichlorodecane
      3. 1,10-dichlorodecane
      4. Dichloroparaffin wax
      5. Dibromo-gasoline hydrocarbons
      6. Dichloro-kerosene hydrocarbons
   B. Esters from dihalogenated esters.
      These are of three classes containing several types depending on the position of the halogen atoms.
      1. Both halogens in the alcohol radical.
         These esters are if the type, $RCO_2R'(O.CO.R'')_2$ in which $R'$ is a trivalent organic radical. The esters are derived from the dichloro-esters $RCO_2R'Cl_2$. These esters are distinguished in that they hydrolyze to form two acids, $RCO_2H$ and $R''CO_2H$, and a trihydroxy organic compound $R'(OH)_3$ or a hydroxyketone. Examples of dihalogenated esters which may be used are:

a. 2,2-dichloroethyl stearate
    b. Dichloro-carnauba wax
    c. Dichloro-candelilla wax 2. Both halogens in the acid radical.

These esters are of the type, $(RCO_2)_2R'CO_2R''$, in which $R'$ is a trivalent organic radical. The dichloro-esters from which these are derived have the formula $R'Cl_2.CO_2R''$. These esters are distinguished in that they hydrolyze to form an alcohol, $R''OH$, an acid, $RCO_2H$, and a dihydroxyacid $R'(OH)_2CO_2H$ or a keto-acid if both halogens were originally on the same carbon atom. Examples of dihalogenated esters which may be used are:

a. Methyl alpha, alpha-dichlorostearate
    b. Dichloro-beeswax
    c. Dibromo spermaceti
    d. Methyl alpha, beta-dichlorostearate
    e. Ethyl cinnamate dibromide
    f. Methyl alpha, iota-dichlorostearate 3. One halogen in each radical.

These esters are of the type, $RCO_2R'CO_2R''.O.COR$ in which $R'$ and $R''$ are divalent organic radicals. The starting chloro-esters have the formula $R'Cl.CO_2R''Cl$. These esters are distinguished in that they hydrolyze to form an acid, $RCO_2H$, a hydroxyacid, $R'(OH)CO_2H$, and a glycol, $R''(OH)_2$ which may be vicinal or disjoined depending on the position of the original halogen atoms. Examples of dihalogenated esters which may be used are:

a. Beta-chloroethyl alpha-chlorostearate
    b. Gamma - chloropropyl iota-chlorostearate
    c. Dichloro-candelilla wax III. Esters from polyhalogen compounds The products of our invention may or may not contain halogen from one or both of two sources depending on the starting materials and their treatment. The halogen compound may be treated so as to remove all or only part of the halogen. Furthermore, the acid whose sodium or other metal salt is used in the condensation may or may not contain halogen itself. Halogen from this source will remain in the final product. For example, we may use sodium o-chloro-benzoate as a reagent or we may use a chlorwax containing 23 percent halogen and treat it with insufficient quantities of metal salt or for insufficient time or at too low a temperature to remove all the halogen from the chlorwax. In order to obtain substantially halogen-free esters as final products, we treat our halogen compound at a sufficiently high temperature for a sufficient time with a suitable excess of a halogen-free sodium salt as described below.

For use in lubricating oils, it is desirable that the compounds employed should have a vapor pressure of less than atmospheric at a temperature of about 250° F. Compounds having this vapor pressure will not vaporize during use in an internal combustion engine or as a crank case lubricant.

The condensation of the chlorinated wax with the anhydrous sodium salt is effected by heating these two components in the presence of small amounts of an acid anhydride and a tertiary base, such as pyridine, or dimethylaniline. If the organic acid used is cheaply available in the form of the anhydride, that anhydride is preferable used as a condensing agent; thus, for example, if acetic acid is used to prepare the anhydrous sodium salt, then acetic anhydride is preferably used as the condensing anhydride; however, acetic or any other cheaply available acid anhydride is suitable to effect the condensation.

The use of a tertiary base such as pyridine or dimethylaniline serves to increase the rate of reaction between the components so as to effect the condensation in a shorter time. In general, the condensation is effected by heating the components to a temperature of from 100 to 200 degrees C., usually about 140 degrees C. for 8 to 16 hours; however in the presence of the tertiary base, the condensation is completed in a much shorter time; namely, from 4 to 8 hours at this temperature.

The condensation product is separated from the reaction mixture by washing with water and drying the product by any suitable means, such as, for example, blowing with air at an elevated temperature.

The resulting condensation product is blended with a hydrocarbon oil of any character and the resulting blend is considerably improved in film strength oiliness and penetrative lubricity characteristics. The coefficient of friction between rubbing metals lubricated by the blend is considerably lower than the coefficient of friction when the straight hydrocarbon lubricant is used.

Various types of lubricants are susceptible to treatment by this invention, including paraffin base, naphthenic base and/or asphaltic base hydrocarbon oils and other oils of lubricating viscosity such as animal and vegetable oils, namely, castor oil, sperm oil, cottonseed oil, lard oil, corn oil, and synthetic oils including hydrogenated oils.

The following example of my invention is given to show one embodiment thereof, but it is to be understood that my invention is not limited thereto except in so far as pointed out in the claims. All quantities are given in parts by weight. 130 parts of a relatively pure monochlor wax was heated with 58 parts of the anhydrous sodium salt of chloroacetic acid and 47 parts of free choloracetic acid in the presence of five ml. of acetic anhydride and 2 ml. of pyridine at 140 to 150° C. for 6 hours. The resulting condensation product was washed with water and dilute sodium carbonate solution to remove free acids and dried by air blowing at 140° F. This condensation product when blended with 99 parts by weight of a hydrocarbon oil greatly improved the load carrying ability, oiliness and penetrative lubricity characteristics and reduced the coefficient of friction between rubbing metal surfaces.

Any number of other examples might be given, but the above example shows that the condensation products prepared as described are particularly efficient in improving the desirable characteristics of a hydrocarbon lubricant.

In the above example, I have used a chlorinted material, but it is to be understood that any of the halogens are suitable in the preparation of my condensation product. For example, fluorine, bromine, or iodine may be used; but since chlorine is so cheaply available, it is the preferred embodiment of my invention.

It will be understood that certain features and sub-combinations are of utility and may be employed without reference to other features and sub-combinations. This is contemplated by and is within the scope of my claims. It is further obvious that various changes may be made in detail within the scope of my claims without departing from the spirit of my invention. It is therefore to be understood that my invention is not to be limited to the specific details shown and described.

Having thus described my invention, I claim:

1. As an addition agent for the improvement of the lubricating qualities of a hydrocarbon oil, a synthetic material obtained by condensing a relatively pure homogeneously chlorinated wax with an anhydrous sodium salt of an organic acid in the presence of an organic acid anhydride and a tertiary base.

2. A synthesis method for the preparation of addition agents for lubricating oils, including the steps of condensing a relatively pure homogeneously chlorinated wax with an anhydrous metal salt of an organic acid in the presence of an organic acid anhydride.

3. A synthesis method for the preparation of addition agents for lubricating oils including the steps of condensing a relatively pure homogeneously chlorinated wax with an anhydrous metal salt of an organic acid in the presence of an organic acid anhydride and a tertiary base.

4. A method of synthesizing addition agents for use in improving the lubricating qualities of hydrocarbon oils, including the step of condensing a relatively pure homogeneously chlorinated wax with an alkali metal salt of an organic acid in the presence of an acid anhydride and a tertiary base.

5. A method of making an addition agent for hydrocarbon oils including the step of condensing a relatively pure homogeneously chlorinated wax with anhydrous sodium chloro acetate in the presence of acetic anhydride and pyridine.

GORDON D. BYRKIT.